(12) United States Patent
Weimer et al.

(10) Patent No.: US 10,955,371 B2
(45) Date of Patent: Mar. 23, 2021

(54) MEASUREMENT ARRANGEMENT FOR MEASURING PROCESS AND STRUCTURE PARAMETERS OF A FIBER COMPOSITE MATERIAL ALONG A MEASURING PATH

(71) Applicant: AIRBUS DEFENCE AND SPACE GMBH, Taufkirchen (DE)

(72) Inventors: Christian Weimer, Munich (DE); Christopher Buchmann, Munich (DE); Henning Becker, Munich (DE); Richard Hesse, Putzbrunn (DE); Andreas Meyer-Giesow, Neubiberg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 112 days.

(21) Appl. No.: 16/204,146

(22) Filed: Nov. 29, 2018

(65) Prior Publication Data

US 2019/0170674 A1     Jun. 6, 2019

(30) Foreign Application Priority Data

Dec. 4, 2017 (DE) ...................... 10 2017 221 821.5

(51) Int. Cl.
  *G01N 27/02* (2006.01)
  *G01M 5/00* (2006.01)
  *G01N 27/20* (2006.01)

(52) U.S. Cl.
  CPC ........ *G01N 27/028* (2013.01); *G01M 5/0083* (2013.01); *G01N 27/20* (2013.01)

(58) Field of Classification Search
  CPC .... G01N 27/028; G01N 27/20; G01M 5/0083
  See application file for complete search history.

(56) References Cited

U.S. PATENT DOCUMENTS

| | | | |
|---|---|---|---|
| 3,662,367 A * | 5/1972 | De Veau, Jr. .......... | G01R 31/08 340/604 |
| 3,939,464 A * | 2/1976 | Swenson .................. | B63G 8/42 367/154 |

(Continued)

FOREIGN PATENT DOCUMENTS

| | | |
|---|---|---|
| DE | 10 2006 022 363 A1 | 11/2007 |
| DE | 10 2009 014 781 A1 | 10/2009 |

(Continued)

OTHER PUBLICATIONS

Multi Triad Cable, https://www.multicable.com/products/multi-triad-cable/ (Year: 2011).*

(Continued)

*Primary Examiner* — Patrick Assouad
*Assistant Examiner* — Demetrius R Pretlow
(74) *Attorney, Agent, or Firm* — Jenkins, Wilson, Taylor & Hunt, P.A.

(57) ABSTRACT

A measurement arrangement for measuring process and structure parameters of a fiber composite material along a measuring path includes a fiber material, a matrix material which surrounds the fiber material at least in regions, and an electrical sensor element that includes at least two signal transmission lines twisted together and aligned along the measuring path in and/or at the fiber material such that the signal transmission lines are surrounded at least in portions by the matrix material, wherein the electrical sensor element is configured to measure the process and structure parameters on the basis of the behavior of electromagnetic signals that are fed into the signal transmission lines.

18 Claims, 2 Drawing Sheets

(56) References Cited

U.S. PATENT DOCUMENTS

| | | | | |
|---|---|---|---|---|
| 4,040,044 | A * | 8/1977 | Laymon | G01V 1/208 340/540 |
| 4,862,146 | A * | 8/1989 | McCoy | G01M 3/04 340/605 |
| 5,015,959 | A * | 5/1991 | Matthews | G01R 31/58 324/557 |
| 5,481,635 | A * | 1/1996 | Arroyo | H01B 7/288 385/103 |
| 5,612,624 | A * | 3/1997 | Clinton | G01R 31/50 324/551 |
| 6,158,106 | A * | 12/2000 | Ohkura | H01L 39/143 257/E39.018 |
| 6,255,594 | B1 | 7/2001 | Hudson | H01B 7/295 174/121 A |
| 6,853,196 | B1 * | 2/2005 | Barnum | G01R 31/11 324/532 |
| 7,977,950 | B2 | 7/2011 | Maslen | |
| 2004/0124849 | A1 * | 7/2004 | Linzey | G01R 31/58 324/557 |
| 2004/0232919 | A1 * | 11/2004 | Lacey | G01R 31/11 324/533 |
| 2004/0251913 | A1 * | 12/2004 | Pharn | G01R 31/11 324/534 |
| 2004/0254442 | A1 * | 12/2004 | Williams | A61B 8/12 600/407 |
| 2006/0086197 | A1 * | 4/2006 | Chen | G01M 5/0025 73/862.451 |
| 2006/0181283 | A1 | 8/2006 | Wajcer et al. | |
| 2012/0105230 | A1 * | 5/2012 | Bockstoce | G08B 25/045 340/568.2 |
| 2012/0146666 | A1 * | 6/2012 | Bottman | G01R 31/11 324/627 |
| 2013/0242760 | A1 * | 9/2013 | Peyton | H04L 43/50 370/250 |
| 2016/0290876 | A1 * | 10/2016 | Koeppendoerfer | G01K 7/16 |
| 2016/0290887 | A1 * | 10/2016 | Gautier | G01M 3/18 |
| 2017/0153285 | A1 * | 6/2017 | Herges | G01R 31/1272 |
| 2019/0265124 | A1 * | 8/2019 | Yu | G01M 3/16 |
| 2019/0304626 | A1 * | 10/2019 | Smith | G02B 6/4469 |

FOREIGN PATENT DOCUMENTS

| | | |
|---|---|---|
| EP | 3 035 041 A1 | 6/2016 |
| EP | 3 035 042 A1 | 6/2016 |
| EP | 3 035 043 A1 | 6/2016 |

OTHER PUBLICATIONS

Dominauskas et al., "Electric time-domain reflectometry sensor for online flow sensing in liquid composite molding processing," Composites: Part A—Applied Science and Manufacturing, vol. 34, pp. 67-74 (2003).

Dominauskas et al., "Electric time-domain reflectometry distribution flow sensor," Composites: Part A—Applied Science and Manufacturing, vol. 38, pp. 138-146 (2007).

"Twisted-Pair-Kabel," Wikipedia: The Free Encyclopedia. Page last updated on Mar. 15, 2019. <https://de.wikipedia.org/wiki/Twisted-pair-Kabel >[Retrieved with English version on Mar. 25, 2019. <https://en.wikipedia.org/wiki/Twisted_pair>].

German Office Action for Application No. 10 2017 221 821.5 dated Mar. 1, 2019.

Buchmann et al., "Investigation of Electrical Time Domain Reflectometry for infusion and cure monitoring in combustion with electrically conductive fibers and tooling materials," Composite Part B: Engineering, vol. 94, Issue 1, pp. 389-398 (2016).

Extended European Search Report for Application No. 18203116.1 dated May 23, 2019.

German Office Action for Application No. 10 2017 221 821.5 dated Dec. 20, 2017.

* cited by examiner

MEASUREMENT ARRANGEMENT FOR MEASURING PROCESS AND STRUCTURE PARAMETERS OF A FIBER COMPOSITE MATERIAL ALONG A MEASURING PATH

CROSS-REFERENCE TO RELATED APPLICATION

This application claims priority to German Application No. DE 10 2017 221 821.5 filed Dec. 4, 2017, the entire disclosure of which is incorporated by reference herein.

TECHNICAL FIELD

The disclosure herein relates to a measurement arrangement for measuring process and structure parameters of a fiber composite material along a measuring path.

BACKGROUND

Even though it is employable in various applications, the disclosure herein and its underlying problem are explained in more detail in relation to fiber composite components for aircraft. However, the described methods and apparatus can likewise be used for general fiber composite components for very different applications.

Fiber composite materials, such as carbon fiber reinforced plastic (CFRP), for example, are increasingly used in modern aircraft construction. In order to guarantee a quality standard within the scope of the production of components made of such materials, it is advantageous to monitor process and structure parameters of the production method as accurately as possible, without this impacting the quality of the components and/or without this driving up the production costs. By way of example, important process and structure parameters comprise a degree of curing or a cross-linkage of a matrix material, a current position of the flow front of a liquefied matrix material, potential damage to a semi-finished product and/or a pre-mold, etc. A method for determining such properties in spatially resolved fashion, e.g., along a line-shaped sensor, in particular, is the electrical time-domain reflectometry (TDR); see, e.g., the article Buchmann et al., "Investigation of Electrical Time Domain Reflectometry for infusion and cure monitoring in combination with electrically conductive fibers and tooling materials," Composites Part B: Engineering, 94:389-398, 2016 (referred to below as Buchmann).

In general, TDR is a method for analyzing run lengths and reflection characteristics of electromagnetic signals on transmission lines. TDR is based on the physical principle according to which an electromagnetic signal, e.g., a voltage pulse, is partly or completely reflected if the latter comes across regions in a medium that have different physical properties, for example changes in impedance along a transmission line. Specifically, one or more transmission lines in the aforementioned TDR method serve as line-shaped sensors at and/or in a fiber composite semi-finished product for the purposes of monitoring an infusion or injection process of a matrix material. Here, the introduced matrix material changes the dielectric properties along the transmission line, which in turn become noticeable as changes in the impedance of the line. If a voltage pulse is now fed into the line, it is possible to determine and analyze the reflection behavior and, building thereon, it is possible to obtain spatially resolved and/or time-resolved deductions about the infusion process.

However, electrically conductive fiber and/or tool materials may lead to relevant loss effects, which in turn can impair the measurement. The use of shielded sensors is sometimes proposed for compensation purposes; by way of example, use can be made of a braided shield about a transmission line, see, for example, documents EP 3 035 041 A1, EP 3 035 042 A1 and EP 3 035 043 A1. However, this increases the cross section of the sensors, leading to restrictions in respect of possible applications since, inter alia, the sensors require a greater installation volume.

SUMMARY

Against this background, the disclosure herein is based on an object of finding improved solutions for monitoring process and structure parameters of fiber composite materials, the solutions being as space-saving as possible, simple and cost-effective.

According to the disclosure herein, this object is achieved by a measurement arrangement having features disclosed herein.

Accordingly, a measurement arrangement is provided for measuring process and structure parameters of a fiber composite material along a measuring path. The measurement arrangement comprises a fiber material; a matrix material, which surrounds the fiber material at least in regions; and an electrical sensor element that comprises at least two signal transmission lines that are twisted together and aligned along the measuring path in and/or at the fiber material in such a way that the signal transmission lines are surrounded at least in portions by the matrix material, wherein the electrical sensor element is embodied or configured to measure the process and structure parameters on the basis of the behavior of electromagnetic signals that are fed into the signal transmission lines.

Further, the use of a measurement arrangement according to the disclosure herein for measuring process and structure parameters along a measuring path during the production of a fiber composite component is provided.

Further, the use of a measurement arrangement according to the disclosure herein for measuring process and structure parameters along a measuring path in a fiber composite component is provided.

Further, provision is made of a fiber composite component comprising a fiber material; a matrix material, which surrounds the fiber material at least in regions; and an electrical sensor element that comprises at least two signal transmission lines that are twisted together and aligned in and/or at the fiber material in such a way that the signal transmission lines are surrounded at least in portions by the matrix material.

The concept underlying the disclosure herein regards using twisted lines or conductors as sensors. Twisted conductors, e.g., twisted pairs, offer improved protection against electric and magnetic disturbance fields when compared to conductors guided in parallel or ribbon cables or the like since the influences of the disturbance fields average out on account of the arrangement of the conductors that alternates portion-by-portion. For this reason, attenuation effects in the case of measurements in the presence of electrically conductive materials are significantly lower. This enables measurements with a greater accuracy and, moreover, the evaluation of longer sensor cables for monitoring larger regions. The substance to be monitored, e.g., an artificial resin, may completely surround the lines and consequently penetrate into the electric field around the conductors, leading to changes in the dielectric properties. This change (e.g. air vis-à-vis resin or liquid resin vis-à-vis cured resin) can be captured in spatially resolved fashion by analyzing the reflection and/or transmission characteristics of the fed signals, for example by evaluating amplitude and/or a propagation time of the reflected voltage pulse. This leads to increased process control on account of a possible capture of a flow front and/or a degree of curing of a matrix material, for example. The reliability of products can be improved by timely identification of defects during operation, e.g. breaks or instances of delamination, which lead to cable breaks. The solution according to the disclosure herein requires no additional shielding and it is consequently implementable in space-saving and miniaturized manner; by way of example, use can be made of varnished copper wires with a very thin insulation. Moreover, this leads to a reduction in the influence of the sensor on the process or on the component. The sensors can be arranged at the fiber material, for example directly resting against the fiber material. Alternatively, the sensors may also be partly or completely integrated into the fiber material. In principle, the sensor may remain in the fiber composite component not only during the entire production process, including curing and completion. Moreover, the sensor can continue to be used in a targeted manner within the component during the later use, for example for monitoring the component or the like. Finally, a measurement system that is easy to handle (twisted lines can be laid without great outlay in a curved arrangement, too, for example) is provided at low cost and with small dimensions (e.g., a shielding is missing), the measurement system nevertheless ensuring efficient and precise monitoring of the process and structure parameters.

Advantageous configurations and developments emerge from the further disclosure herein, with reference being made to the figures.

According to a development, provision can further be made of a matrix material introduction system. The matrix material introduction system can be embodied or configured to impregnate the fiber material with the matrix material. The signal transmission lines can be aligned in such a way that the signal transmission lines are surrounded at least in portions by the matrix material when the matrix material is introduced.

According to a development, the signal transmission lines can rest against the fiber material. In principle, the signal transmission lines can rest directly against the fiber material without interposed, separating materials. However, provision is likewise made for separating material layers to be able to be situated between the signal transmission lines and the fiber material, via which material layers the signal transmission lines rest accordingly against the fiber material. By way of example, the fiber material may be covered by a peeled ply and/or a comparable separation means, which is removed again after the fiber material is cured to form a fiber composite component. Likewise, depending on the specifically employed production method, perforated sheets and/or flow aids or the like may be provided, for example, via which the signal transmission lines rest against the fiber material.

A molding tool may be provided according to a development. The fiber material can rest on the molding tool. Here, the signal transmission lines can be arranged between the molding tool and the fiber material. By way of example, the signal transmission lines can rest against the fiber material.

A flow aid may be provided according to a development. The fiber material can rest on the flow aid. Here, the signal transmission lines can be arranged between the flow aid and the fiber material. By way of example, the signal transmission lines can rest against the fiber material. Here, the flow aid may serve, for example, to promote the transport of the matrix material, e.g. a resin. The flow aid can be embodied or configured in such a way that the latter does not collapse under pressure either and thus creates an air- and/or liquid-permeable space between a vacuum construction or a vacuum film or the like and a mold or tool surface. This ensures that the fiber material is uniformly impregnated with matrix material. The flow aid can be removed directly after impregnating the fiber material, or else at a later stage after the impregnated fiber material is cured to form a fiber composite component.

According to a development, provision can be made of a vacuum construction. The vacuum construction can seal the measurement arrangement. The signal transmission lines can be arranged between the vacuum construction and the fiber material. By way of example, such a vacuum construction may comprise a vacuum film which covers the fiber material with separation structure, signal transmission lines, flow aids, separating layers, etc., in an air-tight manner. At the edge and in interaction with a sealing tape, such a vacuum film can close off an air-tight space in relation to a molding tool, wherein a matrix material introduction system is linked to the sealed space in order to facilitate an injection and/or infusion process by negative or positive pressure, with the aid of which a matrix material is introduced into the fiber material. Consequently, the electrical sensor element of the disclosure herein can be integrated or enclosed in a closed tool construction for the production of a fiber composite component. Consequently, the production process can be monitored, even if the actual construction is not directly optically visible.

The signal transmission lines can be arranged between the vacuum construction and a flow aid resting on the fiber material. In this development, the electrical sensor element is consequently not integrated into the fiber composite component and it does not rest directly against the fiber material or fiber composite component either. Instead, a flow aid is situated between the sensor element, i.e., the signal transmission lines, and the fiber material, the flow aid being removed again during the further course of the production method. Nevertheless, the introduced matrix material reaches the signal transmission lines through the flow aid, and so it is still possible to measure the properties of the matrix material, e.g., a degree of curing and/or a flow-front position.

According to a development, the signal transmission lines can be integrated into the fiber material. Unlike in case of using shielded signal transmission lines or electrical sensor elements, the present solution only uses up very little space and can be provided in a significantly miniaturized form. In this way, depending on the embodiment, the signal transmission lines or the electrical sensor element can be readily integrated into a fiber material and, ultimately, into a fiber composite component, without the structure thereof being significantly influenced. In principle, it is moreover even possible to integrate signal transmission lines into a fiber composite component in a targeted manner and to configure these in such a way that they continue to be usable during the intended use of the fiber composite component. In a specific example, the integrated signal transmission lines or the integrated electrical sensor element can be used to monitor the structure of the fiber composite component, for example. To this end, provision can be made for, e.g., the signal transmission lines to be reachable at the edge from outside of the fiber composite component such that an electrical connection to an external measurement or control device is possible. In an advantageous application, the signal transmission lines can be used to monitor an aircraft structure, for example to monitor structure components in a composite or partial composite construction, for example to determine damage or the like. By way of example, the signal transmission lines can be coupled to sensors, detectors, antennas and/or control devices. The signal transmission lines can be used as sensor elements on the one hand and purely as transmission lines on the other hand.

According to a development, the electrical sensor element can be embodied or configured to measure the process and structure parameters in spatially resolved fashion along the signal transmission lines.

According to a development, the signal transmission lines can be aligned along a propagation direction of the matrix material in and/or at the fiber material.

According to a development, the signal transmission lines can be aligned along a substantially straight line in and/or at the fiber material. By way of example, the signal transmission lines can be arranged along a substantially straight, linear propagation direction. In the case of such a construction, it is consequently possible, for example, to easily and efficiently reconstruct or monitor the flow front of the matrix material in a spatially resolved manner.

According to a development, the signal transmission lines can be aligned in meandering fashion in and/or at the fiber composite semi-finished product. In this development, the signal transmission lines can be consequently arranged in areal fashion; i.e., the measuring path can more or less completely cover an area. In this development, it is possible to obtain a more or less complete picture about the properties of the introduced matrix material over an area.

According to a development, the process and structure parameters can be selected from the group of a degree of curing or degree of cross-linkage of the matrix material, a flow-front position of the matrix material, defects of the fiber material or the matrix material and damage to the fiber material or the matrix material.

According to a development, the electrical sensor element can comprise at least three signal transmission lines that are twisted together. In particular, the electrical sensor element can comprise exactly three signal transmission lines that are twisted together. However, in principle, four, five or more twisted signal transmission lines are also provided. The additional signal transmission lines can be used for different purposes. By way of example, a third signal transmission line can act as a redundant line, by which a measurement continues to be possible should one of the lines fail, e.g., in the case of a cable break or the like.

According to a development, the signal transmission lines can be embodied as insulated single wires. By way of example, the signal transmission lines can be embodied as insulated metal wires, e.g. varnished copper wires, i.e., copper wires with an insulating layer of varnish.

According to a development, a plurality of electrical sensor elements can be provided. Consequently, provision is made, in principle, for a plurality of sensor elements to be integrated in a measurement arrangement, i.e., a construction for producing a fiber composite component. By way of example, a plurality of line-shaped sensor elements can be provided, it being possible for the sensor elements to be aligned in different directions. As an alternative or in addition thereto, provision can be made of a plurality of line-shaped sensor elements, which are placed in different layers in a layer construction or vacuum construction; by way of example, a sensor element (or the signal transmission line thereof) can rest directly against a fiber material or be integrated into the latter, while a further sensor element is situated between a vacuum film and a flow aid. Consequently, a sensor element, for example, may remain in the fiber composite component even after curing, while a further sensor element only serves to monitor the production and it is subsequently removed again. In a further example, a sensor element can be embodied or configured with meandering signal transmission lines, while the signal transmission lines of a further sensor element have a straight-lined arrangement.

According to a development, provision can be made of an analysis device. The analysis device can be embodied or configured to control the electrical sensor element. The analysis device can be embodied or configured to measure the process and structure parameters with the electrical sensor element by way of time-domain reflectometry or electrical time-domain reflectometry (TDR or E-TDR), or time-domain transmissometry or electrical time-domain transmissometry (TDT or E-TDT) or the like. While the reflection behavior of signal pulses is examined during TDR or E-TDR, TDT or E-TDT considers the transmission behavior of electromagnetic pulses or waves. Likewise, further and/or more specific methods that are known to a person skilled in the art are employable or usable, such as, e.g., spread-spectrum time-domain reflectometry (SSTDR) or the like.

To the extent that this is expedient, the aforementioned configurations and developments can be combined with one another as desired. Further possible configurations, developments and implementations of the disclosure herein also comprise combinations of features of the disclosure herein described above or below in respect of the exemplary embodiments, even if the combinations have not been explicitly mentioned. In particular, a person skilled in the art will, in this case, also add individual aspects to the respective basic form of the disclosure herein in order to improve or complement the latter.

BRIEF DESCRIPTION OF THE DRAWINGS

The disclosure herein will be explained in more detail below on the basis of the exemplary embodiments schematically specified in the figures. In the example figures.

DETAILED DESCRIPTION

Figure 1:
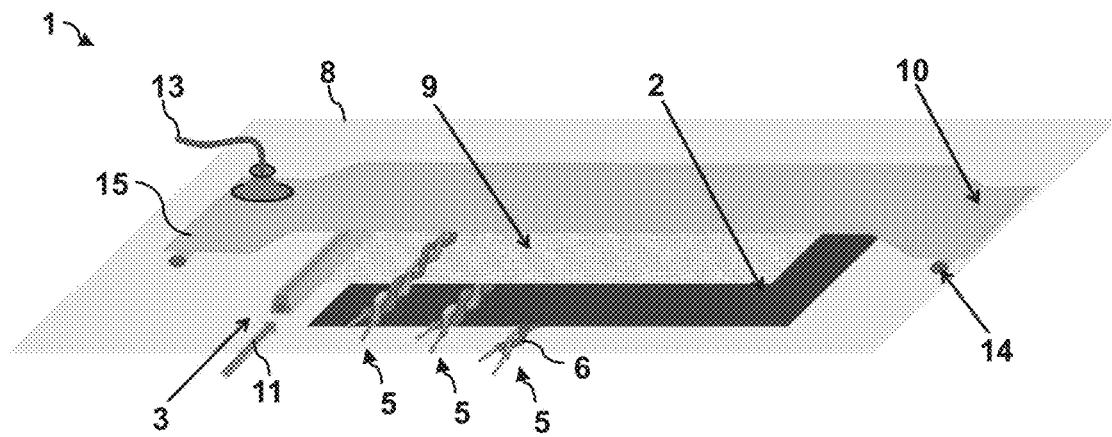
FIG. 1 shows a schematic perspective view of a measurement arrangement according to an embodiment of the disclosure herein.

The attached figures should impart further understanding of the embodiments of the disclosure herein. They elucidate embodiments and serve in conjunction with the description to explain principles and concepts of the disclosure herein. Other embodiments and many of the aforementioned advantages arise in view of the drawings. The elements in the drawings have not necessarily been shown true to scale in relation to one another.

In the figures of the drawing, elements, features and components that are the same, have the same function and have the same effect are provided with the same reference sign in each case—provided nothing else is stated.

FIG. 1 shows a schematic perspective view of a measurement arrangement 1 according to the embodiment of the disclosure herein.

During the production of a fiber composite component, the measurement arrangement 1 serves to measure process and structure parameters along a measuring path. The fiber composite component to be produced can be, for example, a component of an aircraft or spacecraft, e.g., a structure component of a passenger aircraft such as a frame, stringer, etc., or panelling for a passenger cabin or the like. For the purpose of producing the fiber composite component, the fiber material 2, in particular a fiber semi-finished product, is impregnated with a matrix material 4 and subsequently cured under the application of pressure and/or temperature.

To this end, the measurement arrangement 1 comprises a fiber material 2. By way of example, the fiber material 2 can be a fiber scrim, a pre-mold or a corresponding arrangement of reinforcement fibers, which, moreover, may be pre-impregnated. The fiber material 2 is arranged on or in a molding tool 8. By way of example, the fiber material 2 may comprise carbon fibers, glass fibers and/or aramid fibers or the like. Further, the measurement arrangement 1 comprises a matrix material introduction system 3. The matrix material introduction system 3 is embodied or configured to impregnate the fiber material 2 with a matrix material 4 (see FIG. 3) for the purposes of forming the fiber composite component. By way of example, the matrix material 4 can be a fusible, liquefiable or flowable plastic, for example an artificial resin or the like. However, in principle, the fiber material also may be pre-impregnated with the matrix material as an alternative or in addition thereto. Accordingly, the matrix material introduction system 3 can be a resin supply, which comprises e.g. a sprue channel or the like, by which a resin can be introduced in a propagation direction 11. Here, use can be made of an infusion or injection method, for example; i.e., negative pressure or positive pressure on the resin side is exploited to bring the resin into the fiber material 2. The fiber material 2 is covered by a flow aid 9, which in turn is situated under a vacuum film 15 of a vacuum construction 10. Moreover, the vacuum construction 10 comprises a sealing band 14, by which the molding tool 8 with the fiber material 2 is sealed against the vacuum film 15. The measurement arrangement 1, i.e., specifically, the enclosed space between vacuum film 15 and molding tool 8, can be evacuated by way of a vacuum connector 13.

Figure 2:
FIG. 2 shows a schematic view of an electrical sensor element from the measurement arrangement in FIG. 1.

Further, in an exemplary manner, the measurement arrangement 1 comprises three electrical sensor elements 5, which are arranged differently. Each sensor element 5 has two signal transmission lines 6 that are twisted together and aligned in a straight line along the propagation direction 11 of the matrix material 4 in each case. In this respect, FIG. 2 shows one of the sensor elements 5 in an exemplary manner. The signal transmission lines 6 are embodied as electrically insulated single wires, e.g. varnished copper wires. Compared to conductors guided in parallel or ribbon cables or the like, twisted conductors provide better protection against electric and magnetic disturbance fields since the influences thereof average out on account of the arrangement of the conductors that alternates portion-by-portion. Consequently, twisted signal transmission lines 6 are ideally suited in conjunction with electrically conductive fiber and/or tool materials, which would lead to disturbance or loss effects in the case of simple lines.

Along the longitudinal extent, the signal transmission lines 6 form a measuring path along the fiber material 2, wherein the signal transmission lines 6 are aligned or arranged in such a way that the signal transmission lines 6 are surrounded at least in portions by the matrix material 4 when the matrix material 4 is introduced. To this end, the sensor elements 5 are placed in three different arrangements in an exemplary fashion. With the signal transmission lines 6 thereof, one sensor element 5 is arranged between the molding tool 8 and the fiber material 2, resting against the fiber material 2. With its signal transmission lines 6, a further sensor element 5 is arranged between the flow aid 9 and the fiber material 2, resting against the fiber material 2. With its signal transmission lines 6, the third sensor element 5 is situated between the vacuum film 15 and the flow aid 9. All three sensor elements 5 are arranged in such a way that the signal transmission lines 6 are successively surrounded by introduced matrix material 4 or the matrix material flows therearound. As a result, there is a change in the dielectric properties around the signal transmission lines 6, which in turn has an effect on the impedance of the signal transmission lines 6. Consequently, the impedance ultimately is a function of the location along the respective signal transmission line 6. In the present embodiment, this property is exploited to determine the behavior of process and structure parameters, in particular of properties of the matrix material 4 along the measuring path, i.e., along the signal transmission lines 6. Possible measurable process and structure parameters in this case comprise a degree of curing of the matrix material 4, a flow-front position of the matrix material 4, defects of the fiber material 2, damage to the fiber material 2, etc.

To this end, the electrical sensor element 5 is embodied or configured to measure the process and structure parameters on the basis of the behavior of electromagnetic signals 7, the signals being fed into the signal transmission lines 6. This will be explained in more detail with reference to FIG. 3, which shows a schematic illustration of the use of the measurement arrangement 1 from FIG. 1.

The measurement arrangement 1 comprises an analysis device 12 that is embodied or configured to control the electrical sensor element 5. In the specific embodiment in FIG. 3, the analysis device 12 is embodied or configured to measure the process and structure parameters, in particular the degree of curing and/or the flow-front position of the matrix material 4 by way of TDR using the electrical sensor element 5.

Figure 3:
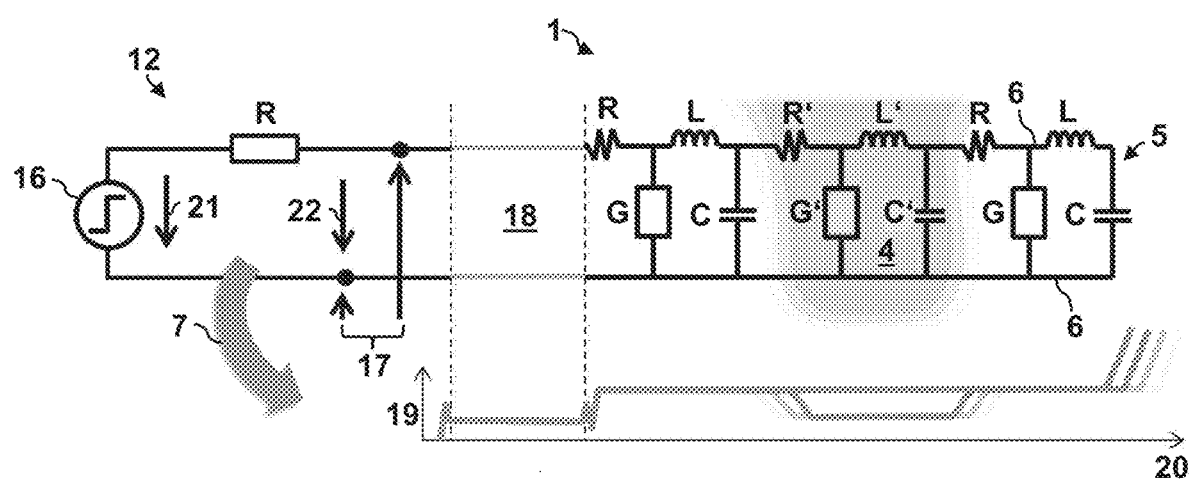
FIG. 3 shows a schematic illustration of the use of the measurement arrangement of FIG. 1.

To this end, the analysis device 12 comprises a pulse generator 16, which is coupled to the signal transmission lines 6 by way of a coaxial cable 18. FIG. 3 shows the equivalent circuit diagram of the electrical sensor element 5 with the inductance per unit length L, L', capacitance per unit length C, C', resistance per unit length R, R' and leakance per unit length G, G', related to the line length. The quantities per unit length depend on the dielectric properties of the surroundings of the signal transmission lines 6. In regions in which the signal transmission lines 6 are surrounded by matrix material 4, the quantities per unit length have different values than in regions without matrix material 4 (see the filled-in area in FIG. 3). Likewise, these quantities depend on the degree of curing or degree of cross-linkage of the matrix material 4 (see different greyscale shadowing of the matrix material 4 in FIG. 3, which indicate different degrees of curing). The pulse generator 16 is embodied or configured to feed a voltage pulse with a specific input voltage 21 into the signal transmission lines 6. This voltage pulse is reflected in the signal transmission lines 6 and subsequently detected and evaluated over time, as an output voltage 22, as an electromagnetic signal 7 by an oscilloscope 17. By way of example, the impedance 19 of the signal transmission lines 6 is plotted schematically as a function of the propagation time 20 bottom right in FIG. 3. What is indicated schematically here is that the impedance depends both on discontinuities (e.g., from the coaxial cable, the end of the signal transmission lines 6, etc.) and on the presence of a more or less cured matrix material 4. By analyzing the impedance or, in general, the behavior of the electromagnetic signal 7, it is possible to deduce the process and structure parameters, in particular the degree of curing and the flow-front position, of the matrix material 4 as a function of location and time. In respect of a detailed explanation of a corresponding measurement method with the aid of TDR, reference is made here to the article by Buchmann. The measurement can be "single-ended", i.e., only one signal transmission line 6 of the sensor element 5 has a voltage applied thereto, while the other signal transmission line 6 serves as earth. So-called differential TDR can be used to further improve the signal-to-noise ratio. Here, the two signal transmission lines 6 of the sensor element 5 have applied thereto signals of opposite polarity. In the case of an unchanging differential signal amplitude, reflections at interference sites along the signal transmission line 6 can be reduced and hence the measurement quality can be further increased (see the article by Buchmann).

The fiber material 2 can be examined for defects even before the introduction of the matrix material 4. Should the fiber material 2 subsequently be impregnated with the matrix material 4, the not yet cured fiber material 2 can be examined anew for defects, without the production being interrupted. If the impregnated fiber material 2 meets the quality requirements to this point, the matrix material 4 is cured. The degree of curing of the matrix material 4 can be detected with the apparatuses and methods described herein, both during curing and within the scope of a final check. Consequently, virtually seamless monitoring of a production process of fiber composite components is possible.

The present embodiment provides a space-saving, simple and cost-effective solution for monitoring process parameters, with the aid of which both the degree of curing and the flow-front position of a matrix material are continuously able to be monitored, and the reliability of products can be ensured by way of a timely detection of defects, e.g., breaks or instances of delamination. The presented solution requires no additional shielding and it is consequently implementable in a space-saving and miniaturized manner. This leads to the influence of the sensor on the process or on the component being reduced, the sensor even being able to readily remain in the fiber composite component. As a result of twisting the lines, the sensor element is comparatively insensitive to external influences, such as, for instance, metallic tools or conducting fibers. Consequently, the precision and/or quality of the measurement can be improved, particularly in comparison with conventional two-wire sensors. Overall, a cost-effective and miniaturizable measurement system that is easy to handle is provided, the measurement system nevertheless ensuring efficient and precise monitoring of the process and structure parameters.

Figure 4:
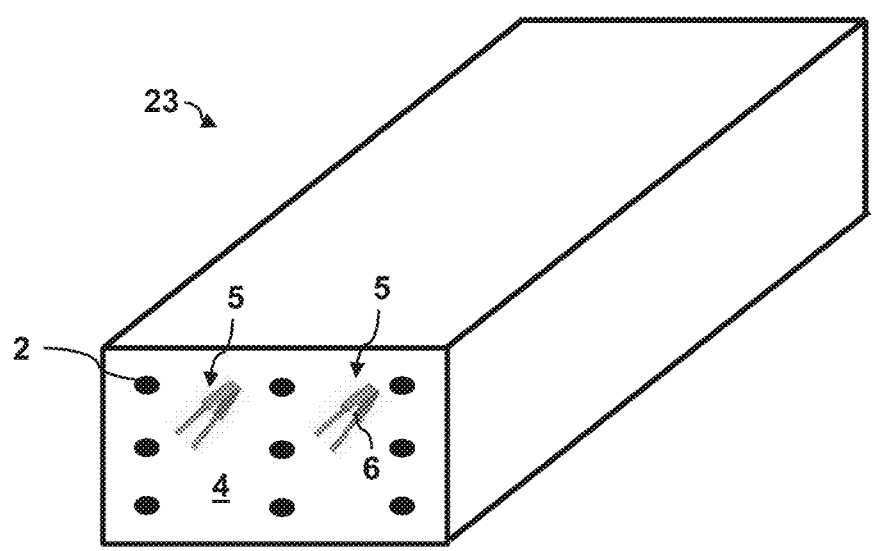
FIG. 4 shows a schematic perspective view of a fiber composite component with the electrical sensor element of FIG. 2.

The electrical sensor elements 5 or signal transmission lines 6 are able not only to merely rest against a fiber material 2 or be arranged in the vicinity thereof. Additionally, provision is made for electrical sensor elements 5 or signal transmission lines 6 to be integrated into fiber material 2. In particular, these components may also remain in the fiber material 2 in order to be used for certain purposes, e.g., for monitoring the structure of the fiber composite component 23 or the like, during the actual application of an already produced fiber composite component 23, as is illustrated in FIG. 4 in an exemplary manner. FIG. 4 shows a fiber composite component 23 with fiber material 2 (reinforcing fibers) and matrix material 4, with a plurality of sensor elements 5 with two twisted signal transmission lines 6 in each case being arranged in the component in such a way that the ends of the signal transmission lines 6 protrude from the fiber composite component 23. As a result, there can be an electrical connection to an external measurement or control device (not plotted here), which can use the signal transmission lines 6 for monitoring the fiber composite component 23, for example in order to determine damage such as breaks or instances of delamination or the like. By way of example, the signal transmission lines 6 can be coupled to sensors, detectors, antennas and/or control devices. The signal transmission lines 6 can be used as sensor elements, on the one hand, and purely as transmission lines, on the other hand.

In the preceding detailed description, various features have been combined in one or more examples in order to improve the stringency of the illustration. However, it should be clear in this case that the above description is purely of illustrative nature and, however, by no means of restrictive nature. It serves to cover all alternatives, modifications and equivalents of the various features and exemplary embodiments. In view of the description above, many other examples will be immediately and directly clear to a person skilled in the art on account of his specialist knowledge.

By way of example, the signal transmission lines 6 can be arranged or aligned in meandering fashion. In this way, not only is it possible to evaluate the process and structure parameters in one dimension along a straight line but also, advantageously, a planar spatial resolution is achieved with a single sensor element 5. Likewise, it is possible to align a plurality of electrical sensor elements 5 in a straight line in different directions in order thus to achieve a multi-dimensional sensitivity of the measurement arrangement 1.

In a further example, the electrical sensor elements 5 may comprise three or more signal transmission lines 6 that are twisted together. The additional signal transmission lines 6 may serve, for example, for redundancy purposes in order to be able to compensate failures of individual signal transmission lines 6.

The exemplary embodiments were selected and described in order to be able to present the principles underlying the disclosure herein and the application possibilities thereof in practice to the best possible extent. As a result, persons skilled in the art can ideally modify and use the disclosure herein and its various exemplary embodiments in relation to the intended use. In the claims and the description, the terms "containing" and "having" are used as neutral concepts for the corresponding term "comprising". Furthermore, a use of the terms "a", "an" and "one" is not intended to fundamentally exclude a plurality of such features and components described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Measurement arrangement
2 Fiber material
3 Matrix material introduction system
4 Matrix material
5 Electrical sensor element
6 Signal transmission lines
7 Electromagnetic signal
8 Molding tool
9 Flow aid
10 Vacuum construction
11 Propagation direction
12 Analysis device
13 Vacuum connector
14 Sealing band
15 Vacuum film
16 Pulse generator
17 Oscilloscope
18 Coaxial cable
19 Impedance
20 Propagation time
21 Input voltage
22 Output voltage
23 Fiber composite component
R, R' Resistance per unit length
C, C' Capacitance per unit length
L, L' Inductance per unit length
G, G' Leakance per unit length

The invention claimed is:

1. A measurement arrangement for measuring process and structure parameters of a fiber composite material along a measuring path, comprising:
 a fiber material;
 a matrix material which surrounds the fiber material at least in regions; and
 an electrical sensor element that comprises at least three signal transmission lines that are twisted together and aligned along the measuring path in and/or at the fiber material such that the signal transmission lines are surrounded at least in portions by the matrix material, wherein the electrical sensor element is configured to measure the process and structure parameters on a basis of behavior of electromagnetic signals that are fed into the signal transmission lines;
 wherein at least one of the at least three signal transmission lines is configured as a redundant signal transmission line, whereby the redundant signal transmission line is configured to take measurements in case another of the at least three signal transmission lines fails.

2. The measurement arrangement according to claim 1, further comprising a matrix material introduction system, which is configured to impregnate the fiber material with the matrix material, wherein the signal transmission lines are aligned such that the signal transmission lines are surrounded at least in portions by the matrix material when the matrix material is introduced.

3. The measurement arrangement according to claim 1, wherein the signal transmission lines rest against the fiber material.

4. The measurement arrangement according to claim 1, further comprising a molding tool, on which the fiber material rests, wherein the signal transmission lines are arranged between the molding tool and the fiber material.

5. The measurement arrangement according to claim 1, further comprising a flow aid, on which the fiber material rests, wherein the signal transmission lines are arranged between the flow aid and the fiber material.

6. The measurement arrangement according to claim 1, further comprising a vacuum construction, which seals the measurement arrangement, wherein the signal transmission lines are arranged between the vacuum construction and the fiber material.

7. The measurement arrangement according to claim 6, wherein the signal transmission lines are arranged between the vacuum construction and a flow aid resting on the fiber material.

8. The measurement arrangement according to claim 1, wherein the signal transmission lines are integrated into the fiber material.

9. The measurement arrangement according to claim 1, wherein the electrical sensor element is configured to measure the process and structure parameters in spatially resolved fashion along the signal transmission lines.

10. The measurement arrangement according to claim 1, wherein the signal transmission lines are aligned along a propagation direction of the matrix material.

11. The measurement arrangement according to claim 1, wherein the signal transmission lines are aligned along a substantially straight line.

12. The measurement arrangement according to claim 1, wherein the signal transmission lines are aligned in meandering fashion.

13. The measurement arrangement according to claim 1, wherein the process and structure parameters are selected from the group consisting of a degree of curing of the matrix material, a flow-front position of the matrix material, defects of the fiber material or the matrix material and damage to the fiber material or the matrix material.

14. The measurement arrangement according to claim 1, wherein the signal transmission lines are insulated single wires.

15. The measurement arrangement according to claim 1, wherein a plurality of electrical sensor elements are provided.

16. The measurement arrangement according to claim 1, further comprising an analysis device that is configured to control the electrical sensor element, wherein the analysis device is configured to measure the process and structure parameters with the electrical sensor element by way of time-domain reflectometry or time-domain transmissometry.

17. A method of using the measurement arrangement according to claim 1, the method comprising:
 providing the measurement arrangement according to claim 1 for measuring process and structure parameters of a fiber composite material along a measuring path; and
 using the measurement arrangement to measure process and structure parameters along a measuring path during production of a fiber composite component and/or in a produced fiber composite component.

18. A fiber composite component comprising:
 a fiber material;
 a matrix material, which surrounds the fiber material at least in regions; and
 an electrical sensor element that comprises at least three signal transmission lines that are twisted together and aligned in and/or at the fiber material such that the signal transmission lines are surrounded at least in portions by the matrix material;

wherein at least one of the at least three signal transmission lines is configured as a redundant signal transmission line, whereby the redundant signal transmission line is configured to take measurements in case another of the at least three signal transmission lines fails.

\* \* \* \* \*